C. W. McDADE.
PNEUMATIC CUSHION.
APPLICATION FILED OCT. 1, 1914.

1,136,968.

Patented Apr. 27, 1915.
2 SHEETS—SHEET 2.

Witnesses

C. W. McDade,
Inventor
by C. A. Snow & Co.
Attorneys

UNITED STATES PATENT OFFICE.

CHARLES W. McDADE, OF MOORHEAD, IOWA.

PNEUMATIC CUSHION.

1,136,968.  Specification of Letters Patent.  Patented Apr. 27, 1915.

Application filed October 1, 1914.  Serial No. 864,498.

*To all whom it may concern:*

Be it known that I, CHARLES W. McDADE, a citizen of the United States, residing at Moorhead, in the county of Monona and State of Iowa, have invented a new and useful Pneumatic Cushion, of which the following is a specification.

The present invention appertains to a pneumatic cushion adapted to fill the office of the ordinary spring for yieldably supporting an automobile or vehicle body upon the axle, and aims to provide a novel and improved pneumatic cushion or air spring, which may be employed in suitable numbers upon an automobile or other vehicle, for supporting the body upon the axles in a thoroughly efficient manner, to avoid the necessity of using pneumatic tires, and to absorb the shocks and jolts in a more thorough manner than with the use of the ordinary elliptical and other body sustaining springs, it being understood, however, that the present device may be employed in various capacities as a cushion, shock absorber, or the like for connecting two relatively movable parts.

As a more specific object, this invention contemplates the provision of a pneumatic cushion of unique construction, embodying two telescoping members or parts having air or other elastic gas or fluid therein, whereby when the members are pushed together, the air or fluid may be compressed readily to arrest or retard the telescoping movement of the members together, and whereby when the pressure upon the members is relieved, they will separate slowly, means being provided for causing the gradual or retarded expansion of the air or fluid, to the said end.

Another specific object of the invention, is to provide novel means for lubricating the telescoping and contacting parts as they reciprocate relative to one another.

It is also within the scope of this invention, to provide a pneumatic cushion which will be improved generally in its construction, to enhance the utility thereof, and whereby the present device will be comparatively simple and inexpensive in construction, as well as being thoroughly practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1:
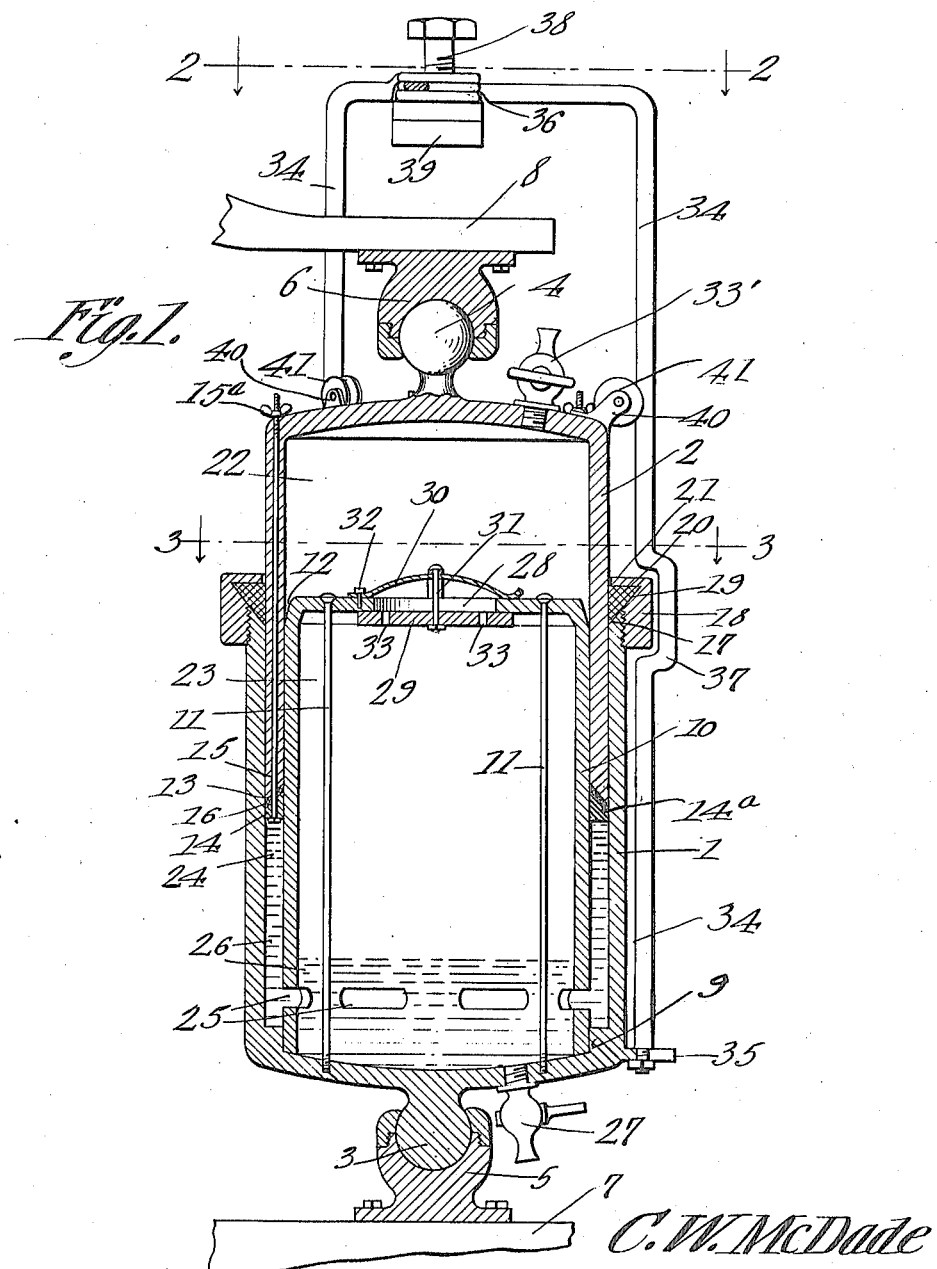
Figure 2:
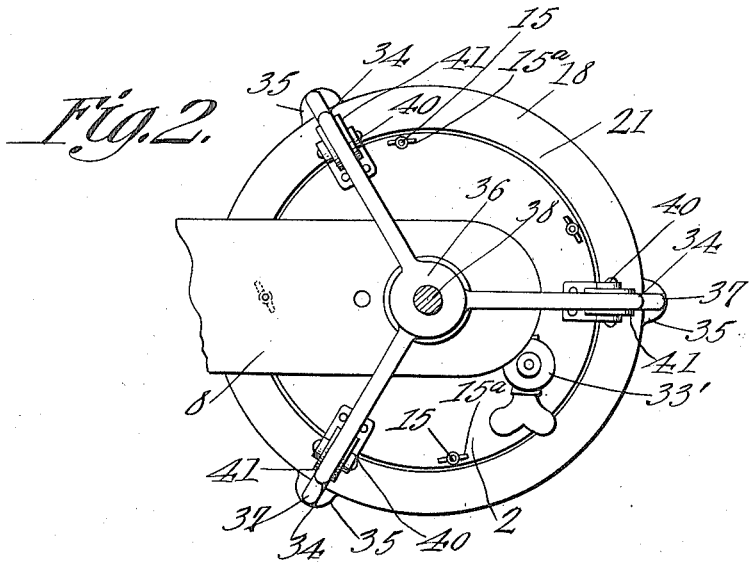
Figure 3:
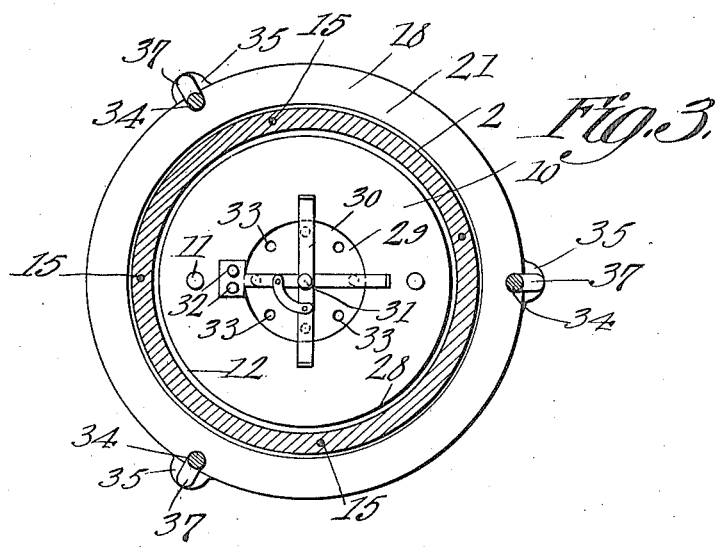

Figure 1 is a central vertical or longitudinal section of the improved pneumatic cushion. Figs. 2 and 3 are horizontal or cross sections taken on the lines 2—2 and 3—3, respectively, of Fig. 1.

The present device embodies broadly, upper and lower telescopic sections or members which have air or gas chambers therein. The lower section or member embodies an upright cylinder 1, which has its upper end open, so that the same is in the form of an upright cup, while the upper section or member embodies an upright cylinder 2 having its lower end open so that the same is in the form of an inverted cup or bell. The lower or open end of the cylinder or bell 2 telescopes snugly into the upper or open end portion of the lower or outer cylinder 1, to provide an expansible and contractile casing.

In order to interpose the present device between two relatively movable parts, such as the axle and body of an automobile or other vehicle, the remote or closed ends of the cylinders 1 and 2 are provided with the respective knobs or balls 3 and 4 projecting centrally therefrom, and having the respective socket members 5 and 6 embracing the same to provide universal or ball and socket joints therewith. The lower socket member 5 may be secured in any suitable manner to the axle 7 of a vehicle, while the upper socket member 6 may be secured to the bracket or iron 8 attached to the vehicle body, although the socket members 5 and 6 may be secured to any other relatively movable parts when the present device is to be employed in another capacity. Thus, the ball and socket joints provided at the ends of the cylinders 1 and 2, enable the parts to which the ends of the present device are connected, to have relative movements in various directions, the chief movement being a vibratory one to and from each other along the common axis of the cylinders 1 and 2.

The cylinder or cup 1 is provided with an integral annular rib 9 in the lower corner thereof, and which snugly receives the lower end of a second part of the lower section or member of the device, said part embodying an inner cylinder 10 having its lower end open, or being in the form of an inverted cup. The cylinders 1 and 10 of the lower section are practically coextensive in length, and the lower portion or rim of the cylinder or bell 2 is received snugly between the cylinders 1 and 10. The cylinder or inverted cup 10 is secured rigidly in place, by means of draft rods or bolts 11 engaged through the upper end of the cylinder 10 and threaded into the lower end of the cylinder 1, adjacent the periphery or side walls of the inside cylinder 10. The upper end of the cylinder 10 is preferably tapered or beveled slightly, as at 12, to facilitate the insertion of the upper cylinder 2 between the lower cylinders 1 and 10.

In order to provide a tight locking joint between the lower end or rim of the upper cylinder 2, and the lower cylinders 1 and 10, the lower end of the cylinder 2 is provided with an inner annular bevel 13, and a ring or annulus 14 is mounted between the cylinders 1 and 10 adjacent the lower end of the cylinder 2, and is provided with an upper outer bevel 14$^a$ parallel with the bevel 13 of the cylinder 2. Clamping rods 15 are engaged through the ring 14 and extend longitudinally through the rim of the cylinder 2 and have thumb nuts 15$^a$ threaded upon their upper protruding ends to rest upon the cylinder 2, to clamp the packing ring 16 between the bevels 13 and 14$^a$ whereby the packing will be expanded outwardly and inwardly into liquid-tight engagement with the inner and outer surfaces of the respective cylinders 1 and 10.

In order to provide a fluid-tight joint between the upper end of the outer cylinder 1, and the periphery of the upper cylinder 2, a gland nut or ring 18 is threaded upon the upper end or rim of the cylinder 1, and the upper end of the said cylinder is provided with an inner bevel 17, while the nut or ring 18 is provided with an inner annular V-shaped groove 19 coöperating with the bevel 17. A packing 20 is engaged within the groove 19, and seats upon the bevel 17 of the cylinder 1, the groove 19 providing an annular inturned lip 21 overhanging and bearing upon the packing 20, whereby when the nut 18 is threaded downwardly upon the cylinder 1, the packing 20 will be contracted into snug engagement with the cylinder 2 to provide a fluid-tight joint.

An air chamber 22 is provided within the cylinder 2 between the upper end of the said cylinder and the upper end of the inside cylinder 10, and a second air chamber 23 is provided with the cylinder 10, while an annular space or chamber 24 is provided between the cylinders 1 and 10 under the cylinder 2. The lower portions of the chambers 23 and 24 are in communication, by means of slots or openings 25 provided in the lower portion of the cylinder 10 and preferably arranged in an annular series. The lower portion of the chamber 23, and the entire portion of the annular chamber 24 are filled with oil or lubricant 26, the oil or lubricant being preferably injected through the bottom of the cylinder 1, by means of a suitable valve 27 engaged through the bottom of the cylinder 1. The valve 27 thus enables the oil to be injected into the lower portion of the chamber 23, whenever necessary, and also enables the oil to be drawn off at will.

The air chambers 22 and 23 are in communication through an opening 28 provided in the upper end of the cylinder 10 and arranged centrally of the cylinders. The upper end of the cylinder 10 is in the nature of an inturned annular flange, forming the opening 28. The opening 28 is normally closed by an upwardly seating valve 29 disposed within the cylinder 10 below the lower face of the upper end or head thereof, the valve 29 being seated upwardly against the upper end or head of the cylinder 10, through the medium of a bowed or star-shaped spring 30 seated upon the upper end of the cylinder 10, a bolt or connecting member 31 being engaged through the central portions of the spring 30 and valve 29. Thus, the spring 30 will yieldably seat the valve 29, one arm or terminal of the spring 30 being secured rigidly in place upon the upper end of the cylinder 10, by means of screws or other securing members 32. The valve 29 is provided with restricted apertures 33, to provide for a restricted communication between the air chambers 22 and 23 when the valve is seated. The head or upper end of the cylinder or bell 2, is provided with a suitable valve 33', whereby air may be injected into or withdrawn from the air chamber 22, and the valve 33' must be connected to a suitable pressure tank for automatically supplying compressed air into the chamber 22.

As a means for limiting the separation of the upper and lower sections 1—10 and 2 and for guiding them for axial movement relative to one another, a plurality of vertical rods 34 have their lower ends detachably engaged to outstanding slotted ears 35 formed upon the lower end of the cylinder 1, and have their upper ends converging and formed with overlapped eyes 36. The rods 34 are arranged about the cylinders 1 and 2, and have the offset portions 37 passing around the gland nut 18 to prevent interference therewith. A bolt 38 passes through the eyes 36, and carries a lower buffer 39 against which the bracket 8 is adapted to impinge when the two sections of the present device are separated to the desired limit. The upper end of the cylinder 2 is provided with ears 40, and grooved guide wheels 41 are journaled to the ears 40 and engage the rods 34 for guiding the cylinder 2 for true reciprocatory movement relative to the cylinders 1 and 10 constituting the lower section of the extensible casing.

In operation, after the required amount of oil or lubricant 26 has been injected into the lower portion of the device, and after a sufficient amount of air or other gas has been injected into the chamber 22 according to the load which is to be sustained by the present device or cushion, the air being normally under compression within the chambers 22 and 23, will tend to expand the extensible casing 1—2 and the rim of the cylinder 2 in raising upwardly within the annular chamber 24 will suck or draw the lubricant 26 from the lower portion of the chamber 23, through the slots 25 and into the chamber 24. Now, when the present device is subject to a compressive strain, it will act as a cushion or air spring, for arresting or retarding the movement of the parts 7 and 8 toward one another. Thus, when the cylinder 2 is moved downwardly relative to the cylinders 1 and 10, the air within the reduced chamber 22 will be further compressed, which will cause the valve 29 to be forced open to enable the compressed air to escape into the lower chamber 23 within which the air is also normally compressed. As a consequence, the air within the chambers 22 and 23 will be brought under such compression, as to arrest the contractile movement of the casing. Furthermore, when the cylinder 2 is moved downwardly within the oil or lubricant chamber 24, the oil or lubricant will be forced from the said chamber 24 through the slots 25 and into the chamber 22, which will even further assist in the compression of air to the desired end. The valve 29 in being yieldably seated, will readily open when the members 1—10 and 2 move toward one another, to enable the air to pass from the chamber 22 into the lower chamber 23. When the sections of the extensible casing start to separate due to the separation of the parts or members 7 and 8 to which the present device is attached, the cylinder 2 in moving upwardly relative to the cylinders 1 and 10 will tend to expand the air within the chamber 22, which, in connection with the compressed air in the chamber 23, will cause the valve 29 to be seated. This will enable the air to pass from the chamber 23 into the upper chamber 22, only through the restricted apertures 33 in the valve 29, and as a result, the cylinders 2 and 1—10 may only separate or expand slowly or gradually, to avoid any shock or jolt, and to retard the separation or return movements of the parts 7 and 8 to their separated positions.

It will be evident that as the cylinder 2 reciprocates within the oil chamber 24, the oil will be alternately forced from and drawn into the chamber 24, whereby the cylinder 2 acts in the nature of a pump for the oil or lubricant, and whereby the oil or lubricant will lubricate the contacting or wearing portions between the cylinders 1, 2 and 10, and will also lubricate the packings 16 and 20 to render them most effective.

The normal pressure of the air or fluid within the chambers 22 and 23 may be adjusted, according to the various circumstances, either by injecting or withdrawing the air through the valve 33'. It is of importance that the present device be employed in connection with a pressure tank having a connection with the valve 33', whereby the desired amount of air may always be provided within the casing, so as to make up for any leakage. In view of the foregoing, taken in connection with the drawing, it is believed that the other advantages and capabilities of the present device will be obvious to those versed in the art, without further or lengthy comment being necessary.

It is also desirable to provide a suitable duct and mud shield of canvas, metal, or any other suitable material, for inclosing the cylinder 2, to prevent the same being coated with dust, grit, or other foreign material, which would be liable to scratch or groove the cylinder.

Having thus described the invention, what is claimed as new is:—

1. A pneumatic cushion comprising an extensible casing having two telescoping sections, one section embodying a rim slidably engaging the other section, a ring disposed adjacent the end of the rim, clamping rods extending longitudinally through the said rim and engaged to the ring, and a packing disposed between the ring and rim and engaging the second mentioned section.

2. A pneumatic cushion comprising an extensible casing having two telescoping sections, one section embodying outer and inner cylinders, and the other section embodying a bell having its rim fitting slidably between the said cylinders, a ring arranged between the cylinders adjacent the end of the said rim, clamping rods extending longitudinally through the said rim and engaged to the ring, and a packing disposed between the ring and rim and engaging the outer and inner cylinders.

3. A pneumatic cushion comprising a cylinder having two telescoping sections, guide rods attached to one section, guide wheels carried by the other section and engaging the said rods, and a buffer carried by the said rods for limiting the movement of the last mentioned section away from the first mentioned one.

4. A pneumatic cushion comprising an extensible casing having telescoping sections, one section embodying outer and inner cylinders having an annular lubricant chamber therebetween, the other section embodying a bell having its rim received snugly by said lubricant chamber, the said inner cylinder being adapted to hold the lubricant and having openings therethrough for the passage of the lubricant into and out of said lubricant chamber, and the chambers within said inner cylinder and bell being in communication.

In testimony that I claim the foregoing as my own, I have hereto affixed my signature in the presence of two witnesses.

CHARLES W. McDADE.

Witnesses:
T. RHONE WILSON,
EARL D. PRATT.